W. W. HINMAN.
Draft-Equalizers.

No. 143,696.  Patented Oct. 14, 1873.

UNITED STATES PATENT OFFICE.

WILLIAM W. HINMAN, OF ELKHART, ILLINOIS, ASSIGNOR TO WILLIAM T. WYLIE, OF SAME PLACE.

IMPROVEMENT IN DRAFT-EQUALIZERS.

Specification forming part of Letters Patent No. 143,696, dated October 14, 1873; application filed May 24, 1873.

*To all whom it may concern:*

Be it known that I, WILLIAM W. HINMAN, of Elkhart, in the county of Logan and in the State of Illinois, have invented certain new and useful Improvements in Three-Horse Equalizers; and do hereby declare that the following is a full, clear, and exact description thereof, reference being had to the accompanying drawings and to the letters of reference marked thereon, making a part of this specification.

The nature of my invention consists in the construction and arrangement of a three-horse equalizer, as will be hereinafter more fully set forth.

In order to enable others skilled in the art to which my invention appertains to make and use the same, I will now proceed to describe its construction and operation, referring to the annexed drawing, in which—

Figure 1:
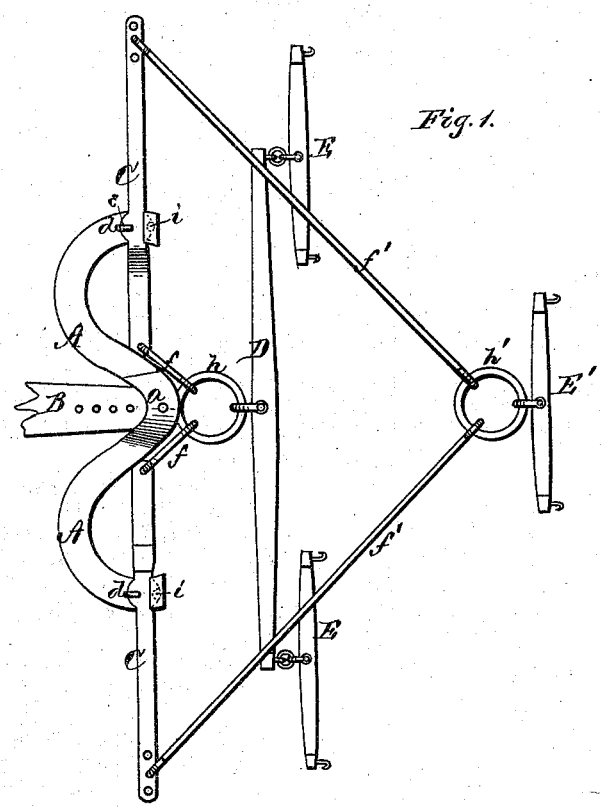
Figure 2:
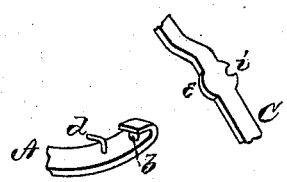

Figure 1 is a plan view of my three-horse equalizer, and Fig. 2 shows the mode of attaching or pivoting the levers.

A represents a curved bar, pivoted by a pin, $a$, on the front end of the plow-beam B. From the center pivot-pin $a$ the bar A curves toward the rear and then forward, so as to form a semicircle on each side of the plow-beam, the extreme ends of the bar being about on a line with the pivot-pin $a$. The ends of the bar A are turned over upward, as shown in Fig. 2, and a pin, $b$, inserted therein to form a pivot, upon which the lever C turns. The lever C is enlarged at the point where it rests on the end of the bar A, with a notch, $i$, in the front side to fit over the pin $b$, and on the back of the lever this enlargement forms a part of a circle, $e$. A hook, $d$, is inserted in the bar A, and extends over this circle, holding the lever in its place, but allowing it to turn or vibrate on the pin $b$. The inner ends of the levers C C are, by links $ff$, connected with a ring, $h$, to which the double-tree D is attached, said double-tree having at each end a single-tree, E. The outer ends of the levers C C are, by rods $f'f'$, connected with another ring, $h'$, to which a single-tree, E', is attached.

This equalizer brings the horses close up to the end of the plow-beam.

Being aware that a draft-equalizer composed of a semicircular bar having a lever pivoted at each end, the two levers being linked together at the center, and having a rod secured to the outer end of each, which are connected by a link in front, is not new; hence I disclaim such as being my invention.

Having thus fully described my invention, what I claim as new, and desire to secure by Letters Patent, is—

The bar A, curved as shown, and pivoted, at its center, directly to the beam B, with its ends turned, and provided with pins $b$ and swivel-hooks $d$, in combination with the levers C C, with projections $e$, and notches $i$, the pivots of the bar A and levers C C being on a line with each other, all as set forth.

In testimony that I claim the foregoing I have hereunto set my hand this 7th day of May, 1873.

WM. W. HINMAN.

Witnesses:
S. B. HUNTER,
JOHN GIBBS.